(12) United States Patent
Gautam et al.

(10) Patent No.: US 9,749,173 B2
(45) Date of Patent: Aug. 29, 2017

(54) SYSTEMS AND METHODS FOR SYNCHRONIZING FORWARDING DATABASES ACROSS MULTIPLE INTERCONNECTED LAYER-2 SWITCHES

(71) Applicants: Vineet Gautam, Dwarka (IN);
Prashant Vashisht, Gurgaon (IN);
Anup Kumar, Noida (IN); Mukesh Chhabra, New Delhi (IN)

(72) Inventors: Vineet Gautam, Dwarka (IN);
Prashant Vashisht, Gurgaon (IN);
Anup Kumar, Noida (IN); Mukesh Chhabra, New Delhi (IN)

(73) Assignee: Ciena Corporation, Hanover, MD (US)

( * ) Notice: Subject to any disclaimer, the term of this patent is extended or adjusted under 35 U.S.C. 154(b) by 133 days.

(21) Appl. No.: 14/275,920

(22) Filed: May 13, 2014

(65) Prior Publication Data
US 2014/0247829 A1 Sep. 4, 2014

Related U.S. Application Data

(63) Continuation-in-part of application No. 13/659,554, filed on Oct. 24, 2012, now Pat. No. 9,098,434.

(30) Foreign Application Priority Data

Sep. 11, 2012 (IN) ............................ 2838/DEL/2012
Mar. 31, 2014 (IN) .............................. 924/DEL/2014

(51) Int. Cl.
*H04L 12/58* (2006.01)
*H04L 29/06* (2006.01)
(Continued)

(52) U.S. Cl.
CPC ........ *H04L 29/0653* (2013.01); *H04L 45/245* (2013.01); *H04L 49/15* (2013.01);
(Continued)

(58) Field of Classification Search
CPC ... H04L 12/4625; H04L 12/467; H04L 45/00; H04L 45/742; H04L 49/354
(Continued)

(56) References Cited

U.S. PATENT DOCUMENTS 6,556,541 B1    4/2003  Bare
7,305,458 B2   12/2007  Hsue et al.
(Continued)

*Primary Examiner* — Ricky Ngo
*Assistant Examiner* — Wei-Po Kao
(74) *Attorney, Agent, or Firm* — Clements Bernard Walker PLLC; Christopher L. Bernard; Lawrence A. Baratta, Jr.

(57) ABSTRACT

A method and a multi-switch architecture include learning a media access control (MAC) address at a first switch in a multi-switch architecture; storing the MAC address in a forwarding database of the first switch; transmitting a data frame to one or more switches in the multi-switch architecture via inter-switch connectivity between the first switch and the one or more switches, wherein the data frame is created to enable the one or more switches to learn the MAC address therefrom; learning the MAC address from the data frame at the one or more switches; and storing the MAC address in a forwarding database for each of the one or more switches. This further includes transmitting the data frame via ports and queues in the inter-switch connectivity that are separate from ports and queues in a data path between the first switch and the one or more switches to avoid data path interference.

19 Claims, 11 Drawing Sheets

(51) Int. Cl.
*H04L 12/709* (2013.01)
*H04L 12/933* (2013.01)
*H04L 12/803* (2013.01)
*H04L 12/24* (2006.01)

(52) U.S. Cl.
CPC ........ *H04L 41/0213* (2013.01); *H04L 47/125* (2013.01); *Y02B 60/33* (2013.01)

(58) Field of Classification Search
USPC ................................. 370/236, 392, 428, 429
See application file for complete search history.

(56) References Cited

U.S. PATENT DOCUMENTS

| | | | |
|---|---|---|---|
| 7,626,930 B2 | 12/2009 | Agmon et al. | |
| 7,760,619 B2 | 7/2010 | Abdulla et al. | |
| 8,130,644 B2 | 3/2012 | Tanaka et al. | |
| 2007/0268915 A1* | 11/2007 | Zelig ................... | H04L 12/4625 370/401 |
| 2008/0089247 A1 | 4/2008 | Sane et al. | |
| 2008/0240106 A1* | 10/2008 | Schlenk .............. | H04L 12/4625 370/392 |
| 2010/0150161 A1 | 6/2010 | Saksena et al. | |
| 2011/0273987 A1 | 11/2011 | Schlansker et al. | |
| 2012/0033541 A1 | 2/2012 | Jacob Da Silva et al. | |
| 2012/0033665 A1 | 2/2012 | Jacob Da Silva et al. | |
| 2012/0033669 A1 | 2/2012 | Mohandas et al. | |
| 2012/0033678 A1 | 2/2012 | Page et al. | |
| 2012/0163164 A1 | 6/2012 | Terry et al. | |

* cited by examiner

SYSTEMS AND METHODS FOR SYNCHRONIZING FORWARDING DATABASES ACROSS MULTIPLE INTERCONNECTED LAYER-2 SWITCHES

CROSS-REFERENCE TO RELATED APPLICATION(S)

The present application/patent is a continuation-in-part of co-pending U.S. patent application Ser. No. 13/659,554, filed on Oct. 24, 2012, and entitled "LOAD BALANCING SYSTEMS AND METHODS OF MAC LEARNING IN MULTI-SLOT ARCHITECTURES," which claims the benefit of priority of co-pending Indian Patent Application No. 2838/DEL/2012, filed on Sep. 11, 2012, and entitled "LOAD BALANCING SYSTEMS AND METHODS OF MAC LEARNING IN MULTI-SLOT ARCHITECTURES," the contents of each are incorporated in full by reference herein. The present application/patent claims the benefit of priority of co-pending Indian Patent Application No. 924/DEL/2014, filed on Mar. 31, 2014, and entitled "SYSTEMS AND METHODS FOR SYNCHRONIZING FORWARDING DATABASES ACROSS MULTIPLE INTERCONNECTED LAYER-2 SWITCHES," the contents of which are incorporated in full by reference herein.

FIELD OF THE DISCLOSURE

Generally, the field of art of the present disclosure pertains to Ethernet systems and methods, and more particularly, to an optimized approach for synchronizing forwarding database across multiple interconnected layer-2 switches such as a plurality of modules in a single chassis.

BACKGROUND OF THE DISCLOSURE

A single switch architecture is not scalable enough to support today's bandwidth hungry applications; therefore various multi-switch architectures have evolved and the general theme among these architectures is a common interconnection mechanism between the various switches. That is, Ethernet switches are evolving from single devices to large scale chassis with multiple line cards, blades, modules, "pizza boxes", etc. As described herein, line cards, blades, modules, "pizza boxes", etc. all refer to modules in an Ethernet switch, and are collectively referred to herein as line cards. In one example, each line card in a chassis can be an individual switch; although other embodiments can also be implemented and are consider herein. As described herein, the term line card can be used interchangeably for the term switch or interconnected switches. For example, individual line cards are each a switch, and the overall chassis or network element is a multi-switch architecture that is a single network element of the interconnected switches. From a network management/administrator's perspective, all these interconnected switches should give a singular switch view, e.g. it is not feasible to manage each line card as a separate network element. This architecture presents multiple challenges; one of them is a challenge of packet flooding as these switches' forwarding databases are not synchronized and thus media access control (MAC) address table lookup failures could cause flooding. Hence, if a MAC address is learned on say switch-A of an interconnect architecture and a stream with this resolved address starts from port which is on another switch (switch-B) then this stream's packets will get flooded.

MAC address learning is a service provided by a switch in which MAC address and incoming interface information of each packet is learned locally in a database on the switch. This service can be characterized as a learning bridge, in which a source MAC address of each received packet is stored in a forwarding database so that future packets destined for that address can be forwarded only to the bridge interface on which that address is located. Packets destined for unrecognized addresses are forwarded out every bridge interface. MAC address learning helps minimize traffic on the attached Local Area Networks (LANs). As Ethernet switch sizes evolve, maintenance of the forwarding database becomes significant. In the single device case, management of the forwarding database is straightforward in that all processing and storage circuitry related to the forwarding database is on the single device and in communication therein. As the large scale chassis develop, individual line cards have their own forwarding databases thereon that are managed, but need to be synchronized with other line cards in the same Ethernet switch. It is important to synchronize the forwarding databases between the line cards to avoid flooding when a MAC address has already been learned.

Conventionally, the multiple line card solution can include a central repository of the forwarding databases for all associated modules that is updated as and when required. However, this solution can cause the scalability issues especially in the case when the MAC address entries need to be synchronized on a periodic basis in case of topologies such as bridging over link aggregation. Multi chassis architectures therefore employ a solution where line cards periodically update the MAC address in the peer line cards by a messaging mechanism. The messaging mechanism may either be implemented in software through some interprocess communications (IPC) mechanism or may be implemented in hardware (e.g., application specific integrated circuit (ASIC), network processor unit (NPU), field programmable gate array (FPGA), etc.). The hardware based periodic synchronization can utilize a lot of hardware bandwidth at timely intervals. As a result of which hardware switching capacity may exceed its total supported capacity and can result in periodic packet drops due to the synchronization. Among other things, this presents a challenge in meeting service layer agreements with end users.

Generally, conventional approaches to forward database synchronization include a control path forwarding approach and a data path forwarding approach. The control path forwarding approach uses the IPC mechanism for forwarding messages containing MACs to be synced, which is to be configured in a peer switch. The control path forwarding approach suffers from following drawbacks: inefficient and cumbersome software implementation, scalability becomes a challenge with increased IPC messaging, and processor load increases proportionally with large number of IPC call for large forwarding databases. The data path forwarding approach includes constructing a packet and sending it via the data path to its peer switches to trigger MAC learning. The data path forwarding approach suffers from following drawbacks: interference with data path bandwidth, and due to the interference, data path packet dropping can be encountered with large forwarding databases.

As switch architectures continue to grow, there is a need for an optimized approach for synchronizing forwarding database across multiple interconnected layer-2 switches such as a plurality of modules in a single chassis.

BRIEF SUMMARY OF THE DISCLOSURE

In an exemplary embodiment, a method includes learning a media access control (MAC) address at a first switch in a multi-switch architecture; storing the MAC address in a forwarding database of the first switch; transmitting a data frame to one or more switches in the multi-switch architecture via inter-switch connectivity between the first switch and the one or more switches, wherein the data frame is created to enable the one or more switches to learn the MAC address therefrom; learning the MAC address from the data frame at the one or more switches; and storing the MAC address in a forwarding database for each of the one or more switches. The method can further include transmitting the data frame via ports and queues in the inter-switch connectivity that are separate from ports and queues in a data path between the first switch and the one or more switches. The method can further include transmitting the data frame with a source address including the MAC address and a switch destination set such that all switches in the multi-switch architecture receive the data frame. The data frame can include a first data frame, and the method can further include transmitting the first data frame to the one or more switches in one direction; and transmitting a second data frame in another direction on the inter-switch connectivity to another switch in the multi-switch architecture, wherein the second data frame is created to enable the another switch to learn the MAC address therefrom.

The method can further include transmitting the data frame with a source address including the MAC address, a switch destination set such that all switches in the multi-switch architecture receive the data frame, and an invalid destination port so the data frame is dropped at the switch destination. The method can further include transmitting the data frame as a sync unicast packet including an inter-switch header and a Layer-2 header. The inter-switch header can include a source switch indicator identifying the first switch, a source port identifier identifying a port on the first switch which learned the MAC address, a destination switch including a last switch of the one or more switches, and a destination port set to an invalid port on the last switch; and wherein the Layer-2 header can include any value for a destination address, a source address set to the MAC address, and empty data. The first switch and the one or more switches can be configured in a link aggregation group. The inter-switch connectivity can operate on a backplane of a chassis. The method can further include, upon learning the MAC address at the first switch and transmitting the data frame, establishing a synchronization refresh timer less than an aging time for the MAC address; and resending the data frame at an expiration of the synchronization refresh timer. The first switch and the one or more switches can be managed as a single switch from a network element perspective and a network management perspective.

In another exemplary embodiment, a multi-switch architecture includes a plurality of interconnected switches each including one or more ports thereon and a forwarding database; inter-switch connectivity connecting the plurality of interconnected switches; data path queues associated with the inter-switch connectivity; and a dedicated queue associated with the inter-switch connectivity and separate from the data path queues, wherein the dedicated queue is configured for the exchange of data frames between the plurality of interconnected switches for synchronization of the forwarding database of each of the plurality of interconnect switches; wherein, upon learning a new media access control (MAC) address on a port of the one or more ports of a switch of the plurality of interconnected switches, the switch transmits a data frame on through the dedicated queue for the remaining interconnected switches to learn the new MAC address. The data frame can include a source address including the new MAC address and a switch destination set such that all switches in the multi-switch architecture receive the data frame. The data frame can include a source address including the new MAC address, a switch destination set such that all switches in the multi-switch architecture receive the data frame, and an invalid destination port so the data frame is dropped at the switch destination. The data frame can include a sync unicast packet including an inter-switch header and a Layer-2 header. The inter-switch header can include a source switch indicator identifying the switch, a source port identifier identifying a port on the switch which learned the MAC address, a destination switch including a last switch of the plurality of interconnected switches, and a destination port set to an invalid port on the last switch; and wherein the Layer-2 header can include any value for a destination address, a source address set to the MAC address, and empty data. The plurality of switches can be configured in a link aggregation group. The inter-switch connectivity can operate on a backplane of a chassis. The plurality of interconnected switches can be managed as a single switch from a network element perspective and a network management perspective.

In yet another exemplary embodiment, a switch includes a plurality of ports; switching circuitry communicatively coupled to the plurality of ports; a forwarding database communicatively coupled to the switching circuitry; and inter-switch connectivity connecting the switch to one or more switches collectively forming a multi-switch architecture managed as a single network element; wherein the switch is configured to: learn new media access control (MAC) addresses received on data ports and ports dedicated to receiving sync packets on the inter-switch connectivity; transmit a sync packet on ports dedicated to transmitting sync packets on the inter-switch connectivity, wherein the sync packets include a source address set to a MAC address to be learned, a destination switch set to a last switch in the one or more switches, and a destination port set to invalid.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE DISCLOSURE

Figure 1:
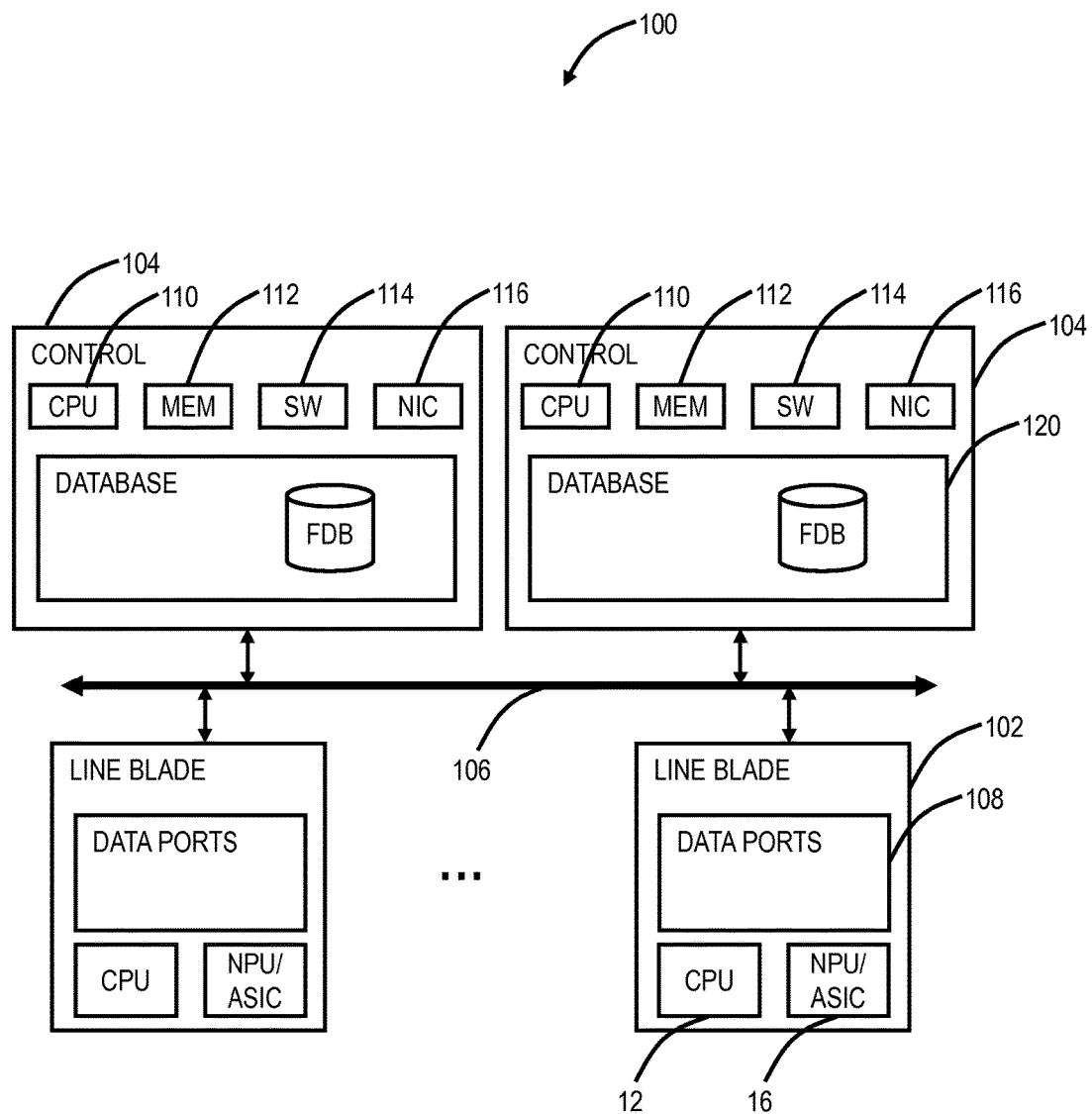
FIG. 1 is a block diagram of an exemplary implementation of a node for the systems and methods described herein.

In various exemplary embodiments, systems and methods for synchronizing forwarding database across multiple interconnected layer-2 switches such as a plurality of modules in a single chassis are described. The systems and methods can be viewed as an enhanced data path forwarding approach where a sync packet is constructed by a switch and sent over backplane ports to peer switches. The peer switches are the other switches in a multi-switch architecture associated with the sending switch. In the systems and methods, a separate queue which is not used for data is used forwarding the sync packets to the peer switches over the backplane ports. Apart from saving on all of the drawbacks of the control path forwarding approach, using a separate queue to forward sync packet reduces the data path interference as well. In a multi-switch architecture, switches communicate via inter-switch connectivity (ports/queues) which is generally of higher bandwidth as the ports/queues are used to transmit both control and data packets across the multiple switches. Each switch in this architecture has pre-configured transition configuration for reaching other switches in an interconnected switch domain, i.e. the multi-switch architecture. The systems and methods utilize this inter-switch connectivity (ports/queues) for synchronization of forwarding database. For syncing MACs across multiple switches, a sync packet is sent over this inter-switch connectivity to trigger remote learning in the remote line card's forwarding database. A sync packet is a packet with a MAC source address (SA) set to the MAC which is needed to be synchronized. The sync packet destination port is set to an invalid port, so it gets dropped and should not be consumed as control or sent out at egress side. The enhanced data path forwarding approach has various advantages including it does not impact the data path, as data path queues are separate queues, and for sending sync packets any low priority queues between interconnected switches will be selected, and the usage of inter-switch connectivity (ports/queues) ensures that syncing performance has better time complexity and lesser software complexity than an out of band implementation for sending control packet for synchronizing forwarding database.

The systems and methods offer an effective methodology for synchronizing learned forwarding database (MACs) to the remote switches within an interconnect switch architecture. The systems and methods have following advantages:

1) Elimination of software complexity usually associated with out-of-band synchronization approaches leveraging the CPU intensive Inter-Process-Communication methodology.
2) Does not require dynamic real time provisioning. The systems and methods require one time provisioning to enable synch packet forwarding across all the interconnected switches.
3) Zero consumption of the real-time data bandwidth. The systems and methods use different queue then data path queues.
4) The systems and methods are scalable in terms of increase in number of line cards in interconnected switches. As with each line card, addition transition logic comes pre-configured at hardware level.
5) The systems and methods are also scalable in terms of large number of forwarding database entries.

In various additional exemplary embodiments, the present disclosure provides load balancing systems and methods of MAC address learning across multi-slots in a network element. The load balancing systems and methods provide a hardware synchronization mechanism addressing the aforementioned challenges that evolve with hardware based synchronization. It is an objective of the load balancing systems and methods to enable high data rate scalability between line cards in a distributed system while preventing adverse effects on packet traffic. The load balancing systems and methods include inter alia MAC address updates between network processors using data frames and a hash-based time slot strategy ensuring MAC address updates are distributed over time as opposed to large scale, singular events. Note, in addition to network processors, the load balancing systems and methods can operate with an Ethernet-based circuitry such as Ethernet-based application specific integrated circuits (ASICs), etc. The network processors, Ethernet-based ASICs, etc. can generally be referred to as data path devices.

Referring to FIG. 1, in an exemplary embodiment, a block diagram illustrates an exemplary implementation of the node 100. In this exemplary embodiment, the node 100 is an Ethernet network switch, but those of ordinary skill in the art will recognize the systems and methods described herein contemplate other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and refer generally to components mounted within a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 generally include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the backplane 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a CPU) and a network processor (NP)/application specific integrated circuit (ASIC). As described herein, the line blades 102 can participate in systems and methods for synchronizing forwarding database across multiple interconnected layer-2 switches. Also, as described herein, the line blades 102 can participate in MAC address learning using the NP/ASIC and synchronizing learnt MAC addresses therebetween using hashing algorithms described herein.

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 2:
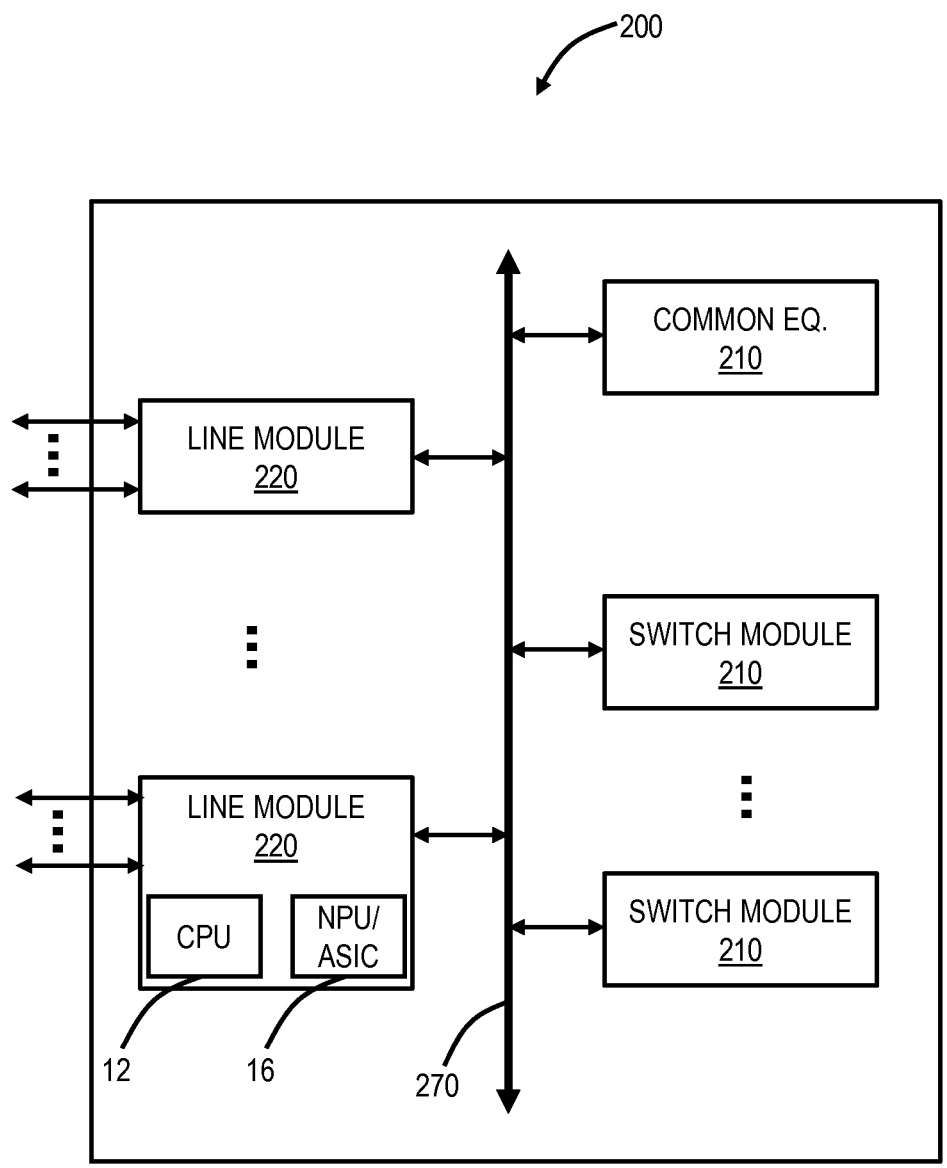
FIG. 2 is a block diagram of another exemplary implementation of a node for the systems and methods described herein.

Referring to FIG. 2, in an exemplary embodiment, a block diagram illustrates another exemplary implementation of a node 200. For example, the node 100 can be a dedicated Ethernet switch whereas the node 200 can be a multiservice platform. In an exemplary embodiment, the node 200 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 200 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching therebetween of channels, timeslots, tributary units, wavelengths, etc. While the node 200 is generally shown as an optical network element, the load balancing systems and methods are contemplated for use with any switching fabric, network element, or network based thereon.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 therebetween. For example, the interface 3270 can be a backplane, mid-plane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three stage Clos switch. The line modules 220 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 220 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 230 can include both Time Division Multiplexed (TDM) (i.e., circuit switching) and packet switching engines. The switch modules 230 can include redundancy as well, such as 1:1, 1:N, etc.

Those of ordinary skill in the art will recognize the nodes 100, 200 can include other components which are omitted for illustration purposes, and that the systems and methods described herein are contemplated for use with a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching therebetween are also contemplated for the systems and methods described herein. In general, the systems and methods described herein contemplate use with any node providing switching or forwarding of channels, timeslots, tributary units, wavelengths, etc.

Figure 3:
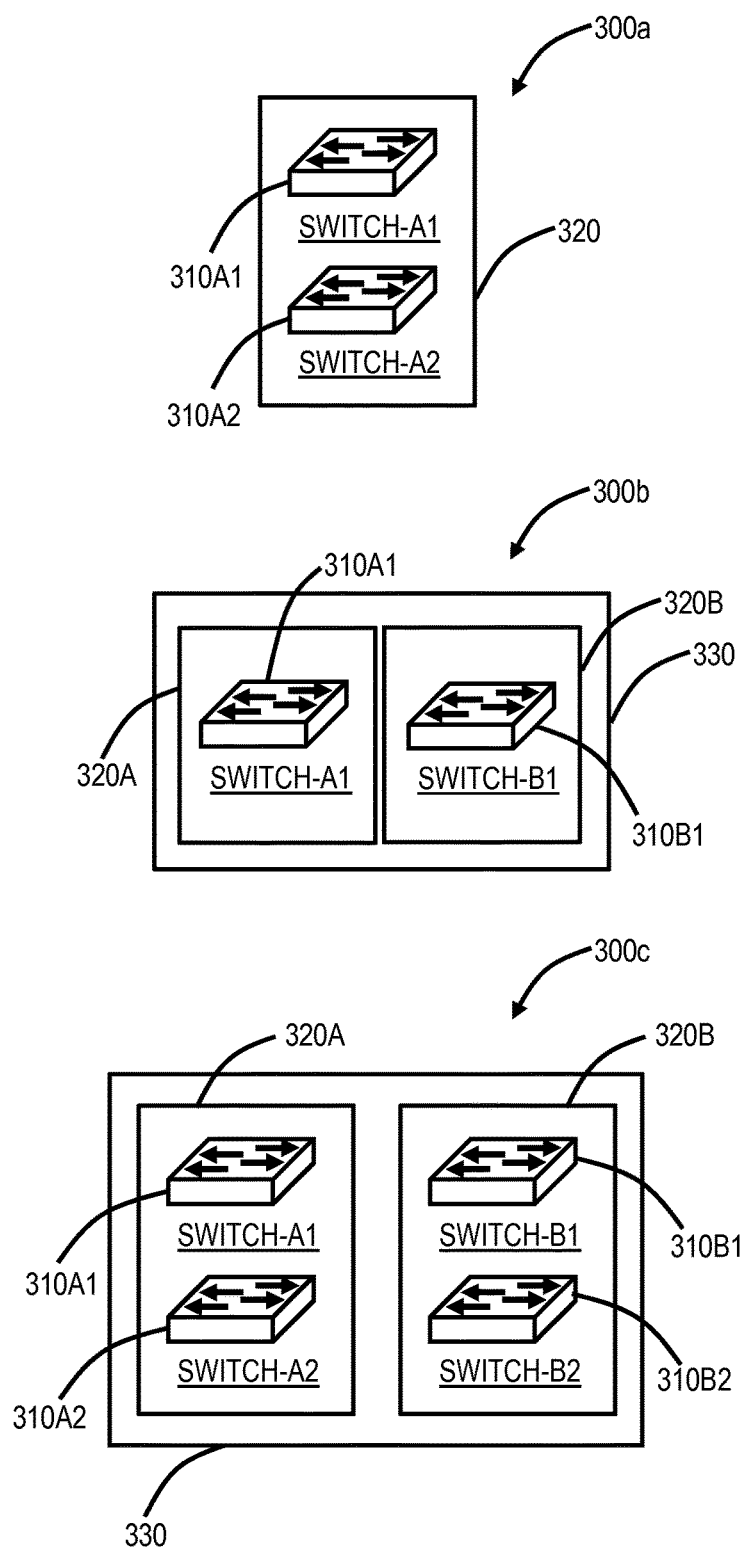
FIG. 3 is a block diagram of various multi-switch architectures for the systems and methods described herein.

Referring to FIG. 3, in an exemplary embodiment, a block diagram illustrates various multi-switch architectures 300a, 300b, 300c for the systems and methods described herein. In the multi-switch architecture 300a, two switches 310A1, 310A2 are located on a same line card 320. In the multi-switch architecture 300b, a switch 310A1 is located on a first line card 320A and a switch 310B1 is located on a second line card 320B. The line cards 320A, 320B are interconnected between one another via a backplane on a chassis 330. In the multi-switch architecture 300c, a first line card 320A includes switches 310A1, 310A2 and a second line card 320B includes switches 310B1, 310B2. The line cards 320A, 320B are interconnected between one another via a backplane on a chassis 330. For inter-switch connectivity between the various switches 310A1, 310A2, 310B1, 310B2, the chassis 330 can include the backplane as well as communications on the line cards 320, 320A, 320B. These multi-switch architectures 300a, 300b, 300c provide a singular view to administrator, i.e. it hides the facts that there are multiple switches 310A1, 310A2, 310B1, 310B2 involved. Administrator just see increased number of ports for establishing services. The multi-switch architectures 300a, 300b, 300c are presented for illustration purposes and those of ordinary skill in the art will recognize various other multi-switch architectures are contemplated.

Figure 4:
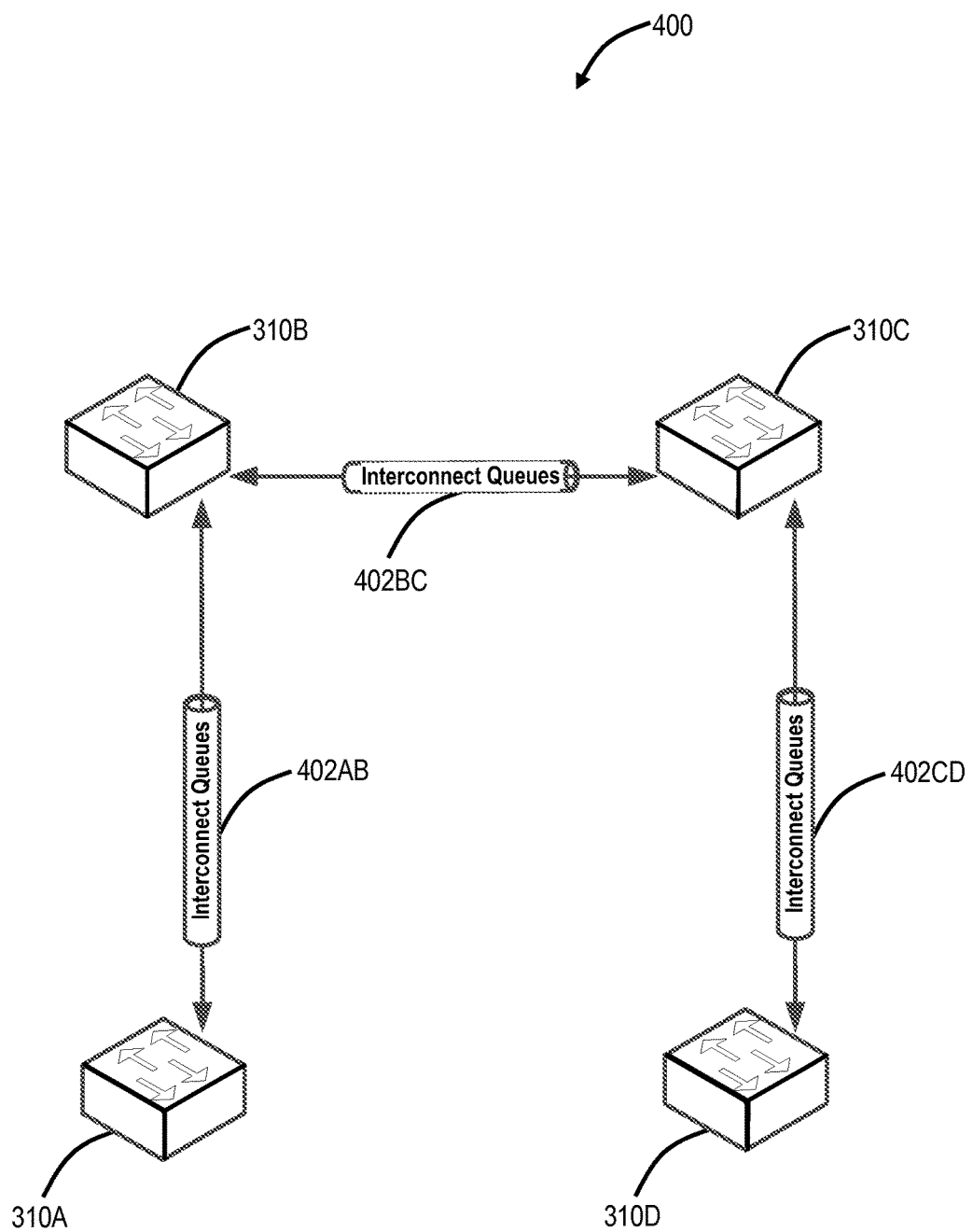
FIG. 4 is a block diagram of a multi-switch architecture and associated inter-switch connectivity via interconnect queues.

Referring to FIG. 4, in an exemplary embodiment, a block diagram illustrates a multi-switch architecture 400 and associated inter-switch connectivity via interconnect queues 402. The switch architecture 400 includes switches 310A, 310B, 310C, 310D. The switch 310A is communicatively coupled to the switch 310B via an interconnect queue 402AB, the switch 310B is communicatively coupled to the switch 310C via an interconnect queue 402BC, and the switch 310C is communicatively coupled to the switch 310D via an interconnect queue 402CD. For example, the switches 310A, 310B can be on a line card with the interconnect queue 402AB located on the line card and/or on a backplane, the switches 310C, 310D can be on another line card with the interconnect queue 402CD located on the line card and/or on the backplane, and the interconnect queue 402BC can be on the backplane. Other embodiments are also contemplated.

Figure 5:
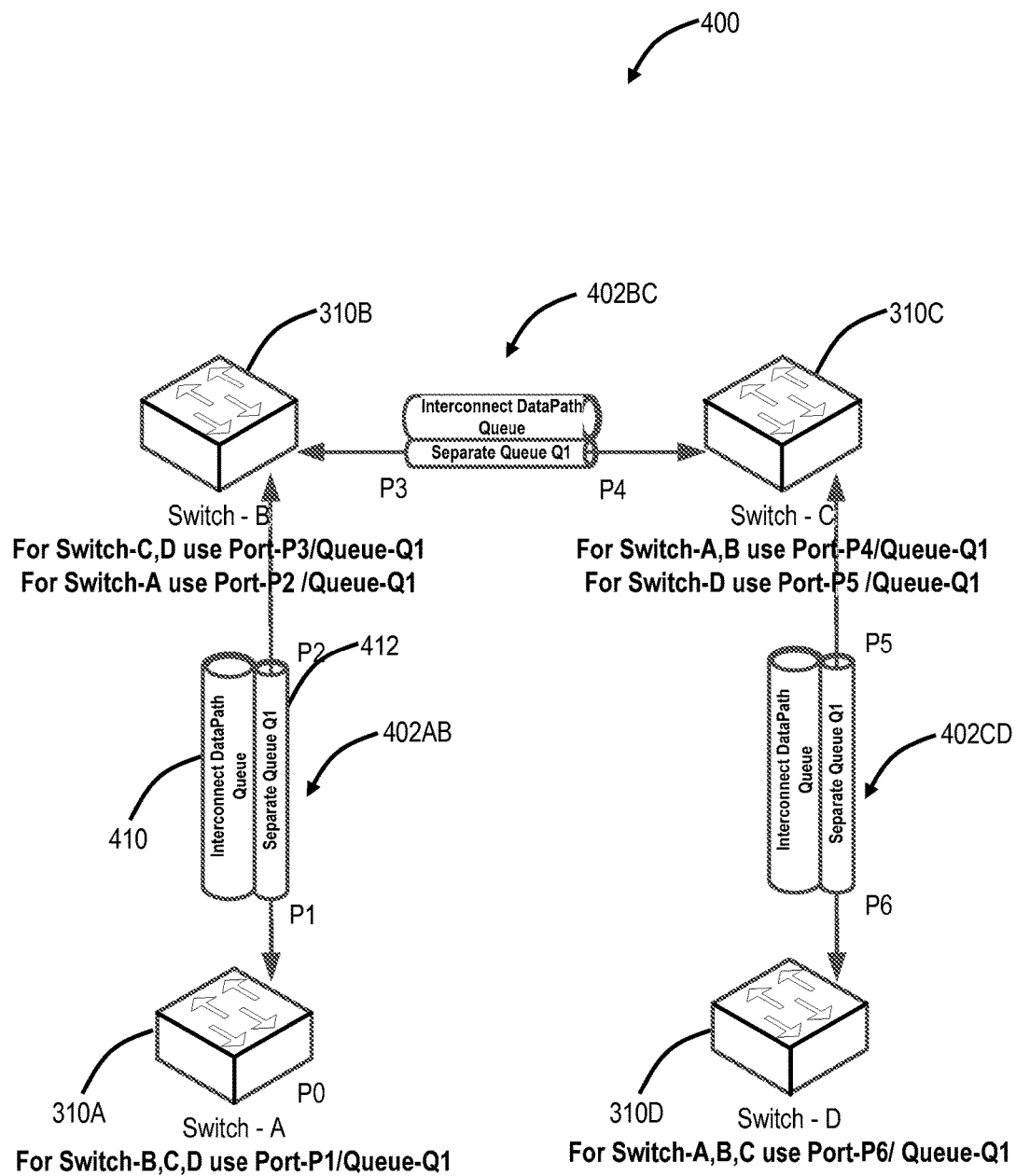
FIG. 5 is a block diagram of a multi-switch architecture and associated inter-switch connectivity via interconnect queues showing an enhanced data path forwarding approach.

Referring to FIG. 5, in an exemplary embodiment, a block diagram illustrates the multi-switch architecture 400 and the associated inter-switch connectivity via interconnect queues 402 showing the enhanced data path forwarding approach. The enhanced data path forwarding approach includes different queues for the data path interconnects and forwarded sync frames for MAC learning. Specifically, each of the interconnect queues 402AB, 402BC, 402CD include an interconnect data path queue 410 and a separate queue (Q1) 412. The switches 310A, 310B, 310C, 310D are configured to transmit sync frames to one another via the separate queue 412 upon learning a new MAC address and include port numbers (P1, P2, P3, P4, P5, P6). For example, the switch 310A can use a port P1 and the separate queue 412 to transmit a sync frame to the switches 310B, 310C, 310D upon learning a new MAC address. The switch 310B can use a port P2 and the separate queue 412 to transmit a sync frame to the switch 310A and a port P3 and the separate queue 412 to transmit a sync frame to the switches 310C, 310D. The switch 310C can use a port P4 and the separate queue 412 to transmit a sync frame to the switched 310A, 310B and a port P5 and the separate queue 412 to transmit a sync frame to the switch 310D. The switch 310D can use a port P6 and the separate queue 412 to transmit a sync frame to the switches 310A, 310B, 310C. In this manner, the sync frames can be transmitted in either direction or both such that any new MAC address learned by any of the switches 310A, 310B, 310C, 310D is subsequently learned by all of the switches. Note, the enhanced data path forwarding approach described herein can also use the load balancing systems and methods described herein.

In an exemplary embodiment, the sync frame can be a unicast packet which includes an inter-switch header and a layer-2 header which can include the following attributes with examples in FIG. 5:

| Inter-switch header | |
|---|---|
| Source switch | Switch learning the new MAC address - e.g., switch 310A, 310B, 310C, 310D |
| Source port | Port number, e.g., P0, P1, P2, P3, P4, P5, P6 |
| Destination switch | End point of the sync frame, will be either switch 310A or switch 310D in FIG. 5 such that all switches see the sync frame |
| Destination port | INVALID |

| Layer-2 header | |
|---|---|
| Destination address (DA) | <don't care> |
| Source address (SA) | Newly learned MAC address, e.g. 00:01:02:03:04:05 |
| Length/Type/VID | X |
| Data | empty |

By using the queues 412 and ports in FIG. 5, the four switches 310A, 310B, 310C, 310D are connected together and can learn the MAC addresses on any of the interconnected switches 310A, 310B, 310C, 310D. Thus, the associated forwarding databases can be synchronized. Note, only MAC addresses learned on a native switch port are forwarded for synchronization, and MAC addresses learned due to synchronization on different switches (remotely learned) are not forwarded for syncing. Trigger for initiating the sync packet is only from native switch (On which MAC is originally learned). The syncing logic is described as follows with reference to FIG. 5. For a MAC address learned on the switch 310A, a sync packet shall be sent via the port P1 and the queue Q1 412 destined to an invalid port of the switch 310D for triggering MAC learning on remote switches (switches 310B, 310C, 310D). The destination port for sync packet should be an invalid port on the destined switch (switch 310D) so that sync packet will get dropped at egress end, without affecting control or data path in the multi-switch architecture 400. The port Px identifies the port to be used for forwarding sync packet so that packet is sent to remote switch via inter-switch connectivity. Qx identifies the queue to be used for forwarding the sync packet so that packet is sent to remote switches via inter-switch connectivity. This queue should be different from data path queues. Using a separate queue will avoid any data path interference due to this sync packet.

Note, the interconnect queues 402AB, 402BC, 402CD must be arranged such that all the switches 310A, 310B, 310C, 310D are reachable from all other switches. For the destination switch, the sync packet is addressed to a last switch in a path of the interconnect queues 402AB, 402BC, 402CD. The interconnect queues 402AB, 402BC, 402CD can be a mesh interconnection of a linear interconnection as shown in FIG. 5. As long as the switches 310A, 310B, 310C, 310D are aware of the architecture, i.e. which interconnect queues 402AB, 402BC, 402CD connect to which switches and the final switch at the end of each path, the interconnect queues 402AB, 402BC, 402CD can be any topology.

Similarly MACs learned on the other switches 310B, 310C, 310D in the multi-switch architecture 400 are forwarded and hence learned on remote switches forwarding databases. These details are captured as follows. For a MAC address learned on the switch 310B, a sync packet shall be sent via P3/Q1 destined to an invalid port of the switch 310D for triggering MAC learning on remote switches (switches 310C, 310D) and another sync packet shall be sent via P2/Q1 destined to invalid port of the switch 310A for triggering MAC learning on the switch 310A. For a MAC address learned on the switch 310C, a sync packet shall be sent via P4/Q1 destined to invalid port of the switch 310A for triggering MAC learning on remote switches (switches 310A, 310B) and another sync packet shall be sent via P5/Q1 destined to invalid port of the switch 310D for triggering MAC learning on the switch 310D. Finally, for a MAC address learned on the switch 310D, a sync packet shall be sent via P6/Q1 destined to invalid port of the switch 310A for triggering MAC learning on remote switches (switches 310A, 310B 310C).

Figure 6:
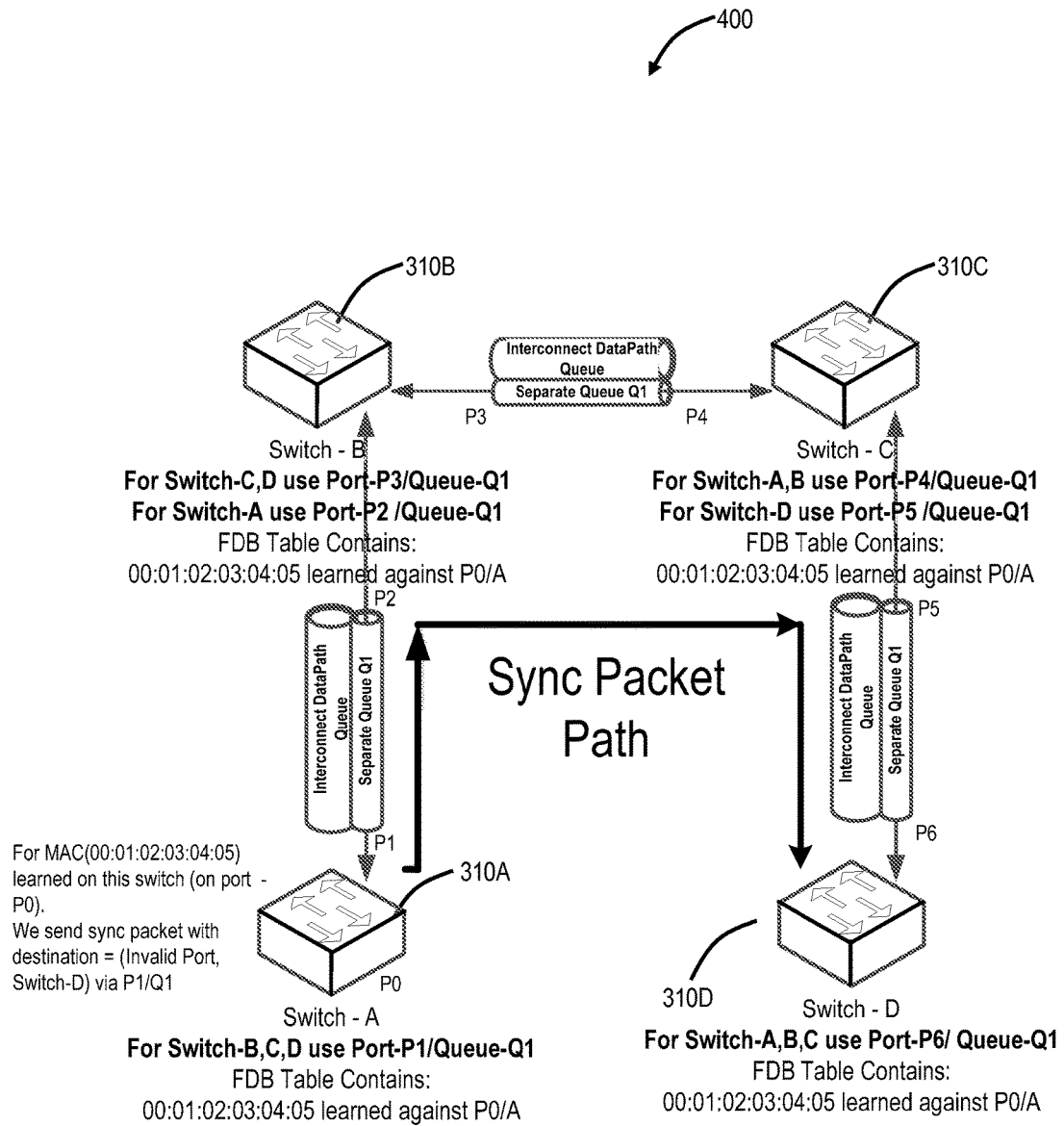
FIG. 6 is a block diagram of a multi-switch architecture showing an exemplary operation the enhanced data path forwarding approach.

Referring to FIG. 6, in an exemplary embodiment, a block diagram illustrates the multi-switch architecture 400 showing an exemplary operation the enhanced data path forwarding approach. Here, the switch 310A learns a MAC {00:01:02:03:04:05} learned on this switch (on a port, e.g. P0). A forwarding database for the switch 310A now includes the MAC {00:01:02:03:04:05} learned against P0 on the switch 310A. A sync packet is sent with the destination={invalid port, switch 310D} via P1/Q1. The sync packet is received at the switch 310B and its forwarding database now includes the MAC {00:01:02:03:04:05} learned against P0 on the switch 310A, and the switch 310B forwards the sync packet to the switch 310C via P3/Q1 since the sync packet destination={invalid port, switch 310D}. The sync packet is received at the switch 310C and its forwarding database now includes the MAC {00:01:02:03:04:05} learned against P0 on the switch 310A, and the switch 310C forwards the sync packet via P4/Q1 to the switch 310D since the sync packet destination={invalid port, switch 310D}. Finally, the switch 310D receives the sync packet and its forwarding database now includes the MAC {00:01:02:03:04:05} learned against P0 on the switch 310A, and the switch 310D discards the sync packet due to the invalid port.

Figure 7:
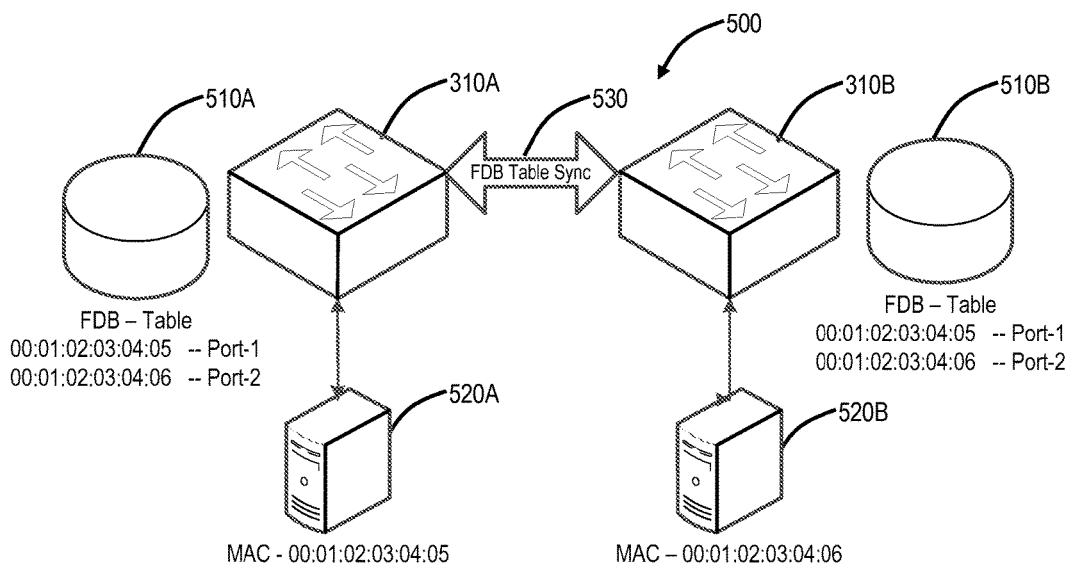
FIG. 7 is a block diagram of a multi-switch architecture with two switches showing an exemplary operation the enhanced data path forwarding approach.

Referring to FIG. 7, in an exemplary embodiment, a block diagram illustrates a multi-switch architecture 500 with two switches 310A, 310B showing an exemplary operation the enhanced data path forwarding approach. Forwarding database synchronization of dynamically learned MAC addresses between the interconnected switches 310A, 310B is aimed at distributing dynamic MAC entries received on a particular switches to other switches in the given equipment group. The synchronization of dynamic MACs reduces flooding of unknown unicast packets by spreading MAC learning across switches under same equipment group. This improves packet processing rate, as packet is transmitted to destined interface instead getting flooded in the entire virtual LAN. Each of the switches 310A, 310B maintains a forwarding database 510A, 510B containing learned MAC entries. On receiving a packet MAC, the SA is checked in the forwarding database 510A, 510B. If the forwarding database 510A, 510B does not contain MAC entries, it is added to the forwarding database 510A, 510B for future forwarding decisions and the packet is flooded to all the ports of a virtual LAN. Again, in a Layer-2 system which combines multiple switches 310A, 310B to enhance switching and bandwidth capability, there are multiple forwarding databases 510A, 510B. To better utilize the multiple switch capability, entries in the forwarding databases 510A, 510B are synchronized to other forwarding databases 510A, 510B, thereby spreading the learning and reduces the flooding of unknown unicast packets.

For example, in FIG. 7, the multi-switch architecture 500 can include the switch 310A being connected to a client 520A (MAC {00:01:02:03:04:05}) and the switch 310B being connected to a client 520B (MAC {00:01:02:03:04:06}). The switch 310A learns the MAC address of the client 520A on a port receiving packets from the client 520A, stores the MAC {00:01:02:03:04:05} in its forwarding database 510A, and synchronizes the client 520A's MAC address with the switch 310B by sending a sync packet to the switch 310B over a link 530 such as on a backplane. The sync packet includes an Inter-switch header of {source switch=switch 310A, source port=P1, destination switch=switch 310B, destination port=INVALID} and a Layer-2 header of {DA=<don't care>, SA=00:01:02:03:04:05}. Upon receipt, the switch 310B learns the MAC {00:01:02:03:04:05} and stores its forwarding database 510B, and discards the sync packet.

The switch 310B learns the MAC address of the client 520B on a port receiving packets from the client 520B, stores the MAC {00:01:02:03:04:06} in its forwarding database 510B, and synchronizes the client 520B's MAC address with the switch 310A by sending a sync packet to the switch 310A over a link 530 such as on a backplane. The sync packet includes an Inter-switch header of {source switch=switch 310B, source port=P2, destination switch=switch 310A, destination port=INVALID} and a Layer-2 header of {DA=<don't care>, SA=00:01:02:03:04:06}. Upon receipt, the switch 310A learns the MAC {00:01:02:03:04:06} and stores its forwarding database 510A, and discards the sync packet.

Figure 8:
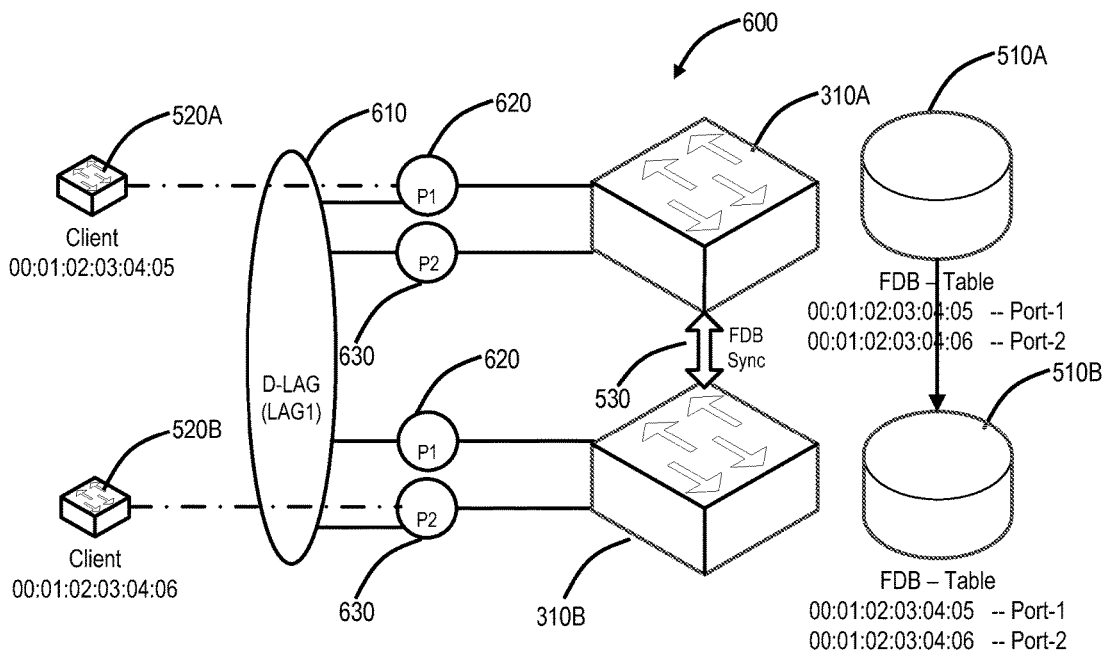
FIG. 8 is a block diagram of a multi-switch architecture with two switches showing an exemplary operation the enhanced data path forwarding approach in a link aggregation group (LAG)

Referring to FIG. 8, in an exemplary embodiment, a block diagram illustrates a multi-switch architecture 600 with two switches 310A, 310B showing an exemplary operation the enhanced data path forwarding approach in a link aggregation group (LAG) 610. The multi-switch architecture 600 includes the same switches 310A, 310B with corresponding forwarding databases 510A, 510B as in FIG. 8. Here, the switches 310A, 310B are configured in the LAG 610. The LAG 610 includes combining (aggregating) multiple connections to increase overall throughput. The LAG 610 includes two ports 620, 630. Synchronization of the forwarding databases 510A, 510B becomes more important in the LAG 610 configuration which has the ports 620, 630 spread across the different switches 310A, 310B. As the LAG 610 gives users a view of a single logical port, hence spreading the forwarding databases 510A, 510B learning to all the switches 310A, 310B which host the LAG 610 ports 620, 630 enhances the LAG 610 behavior and performance.

In FIG. 8, the client 520A is connected to the port 620 on the switch 310A (note, the port 620 is also on the switch 310B as part of the LAG 610). The switch 310A learns the MAC of the client 520A, stores it in the forwarding database 510A, and synchronizes, via a sync packet, to the switch 310B via the link 530. The switch 310B learns the MAC of the client 520A from the sync packet and stores it in the forwarding database 510B. Similarly, the client 520B is connected to the port 630 on the switch 310B (note, the port 630 is also on the switch 310A as part of the LAG 610). The switch 310B learns the MAC of the client 520B, stores it in the forwarding database 510B, and synchronizes, via a sync packet, to the switch 310A via the link 530. The switch 310A learns the MAC of the client 520B from the sync packet and stores it in the forwarding database 510A.

Figure 9:
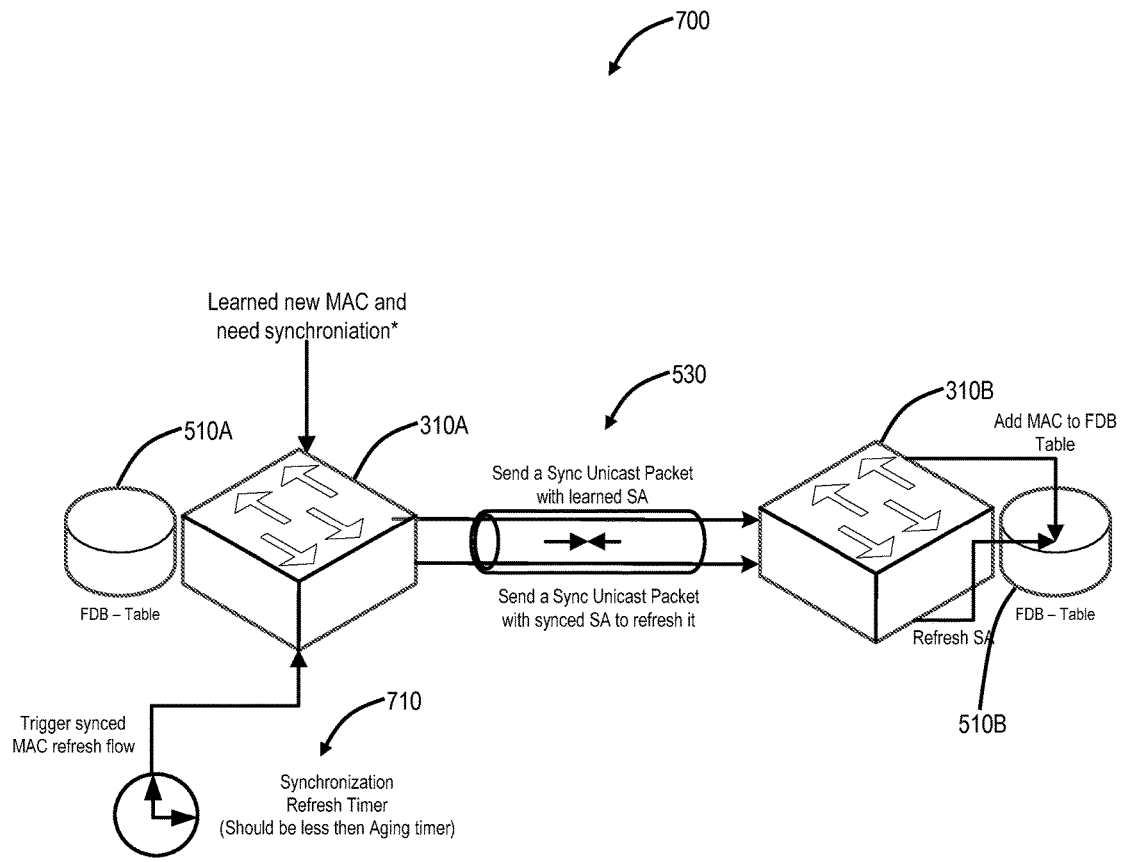
FIG. 9 is a block diagram of a multi-switch architecture with two switches showing an exemplary operation the enhanced data path forwarding approach with synchronization refresh.
Figure 10:
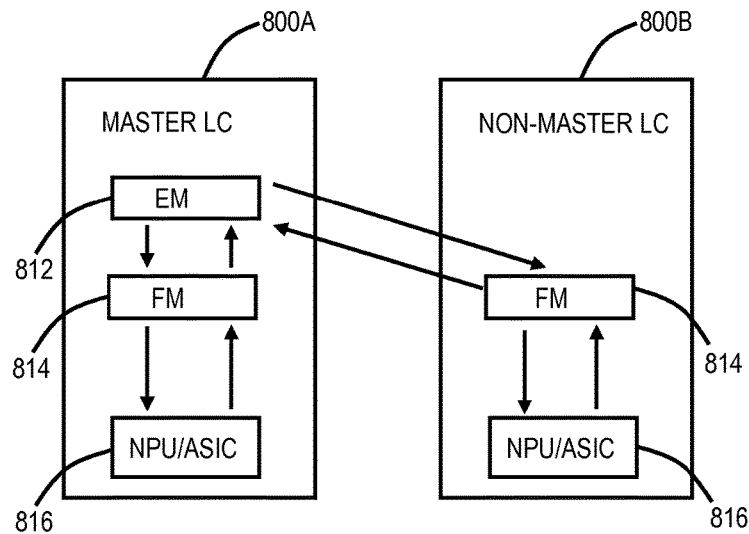
FIG. 10 is a block diagram of two line cards (LCs) performing conventional MAC address synchronization.

Referring to FIG. 9, in an exemplary embodiment, a block diagram illustrates a multi-switch architecture 700 with two switches 310A, 310B showing an exemplary operation the enhanced data path forwarding approach with synchronization refresh. Here, the switch 310A learns a new MAC address, stores it in the forwarding database 510A, sends a sync unicast packet with the learned MAC address to the switch 310B via the link 530, and starts a synchronization refresh timer 710. The synchronization refresh timer 710 should be less than an aging time for the learned MAC address, and upon expiration, the synchronization refresh timer 710 causes the switch 310A to trigger a synced MAC refresh flow on the link 530. The switch 310B receives the initial sync unicast packet and adds the MAC address to a table in the forwarding database 510B. Also, the switch 310B discards the sync packet as it is at the end of the link 530. The switch 310A send periodic sync unicast packets to the switch 310B at the expiration of the synchronization refresh timer 710 which causes the switch 310B to refresh the forwarding database 510B Referring to FIGS. 10-11, in conventional embodiments, a block diagram (FIG. 10) illustrates line cards (LC) 800A, 800B for conventional MAC address synchronization therebetween and a graph (FIG. 11) of throughput capacity of the line cards 800A, 800B. The line cards 800A, 800B are each Ethernet switching modules with one or more ports coupled thereto (not shown). The line card 800A includes an Ethernet manager 812, a forwarding module 814, and a network processor (NPU)/ASIC 816. The line card 800B includes a forwarding module 814 and a network processor (NPU)/ASIC 816. Note, the line card 800A is designated as a master and the line card 800B is designated as the non-master. With respect to the master and non-master line cards 800A, 800B, the master manages the forwarding database (FDB) entries in software and provides associated user interfaces (e.g., CLI, HTTP, SNMP etc.). Each of the Ethernet manager 812, the forwarding module 814, and the NP/ASIC 816 includes integrated circuitry and associated software/firmware for operations thereof. The Ethernet manager 812 can be implemented on a general processor (CPU) or the like, and generally provides control functionality in the line card 800A. The forwarding module 814 is configured to provide switching functionality. The NP/ASIC 816 is an integrated circuit which has a feature set specifically targeted to packet switching, i.e. the NP/ASIC is a data path device. The line cards 800A, 800B can also include a forwarding database which is implemented in circuitry and provides storage of all learnt MAC addresses. This forwarding database can be a stand-alone component or integrated within any of the Ethernet manager 812, the forwarding module 814, and/or the NP/ASIC 816. Those of ordinary skill in the art will recognize that the line cards 800A, 800B can include other components, devices, functions, etc. which are omitted for illustration purposes.

In conventional operation, MAC addresses are learned in the line card 800A utilizing learning functionality associated with the NP/ASIC 816. Whenever a new MAC address is learned, an interrupt is raised by the NP/ASIC 816 that notifies the forwarding module 814 in the line card 800A. Learnt MAC addresses are then propagated to the Ethernet manager 12 from the forwarding module 814 in the line card 800A. The Ethernet manager 812 will send the learnt MAC addresses to other line cards, such as the line card 800B, at periodic intervals ensuring that all line cards 800A, 800B have the same set of MAC addresses in their associated forwarding database.

Figure 11:
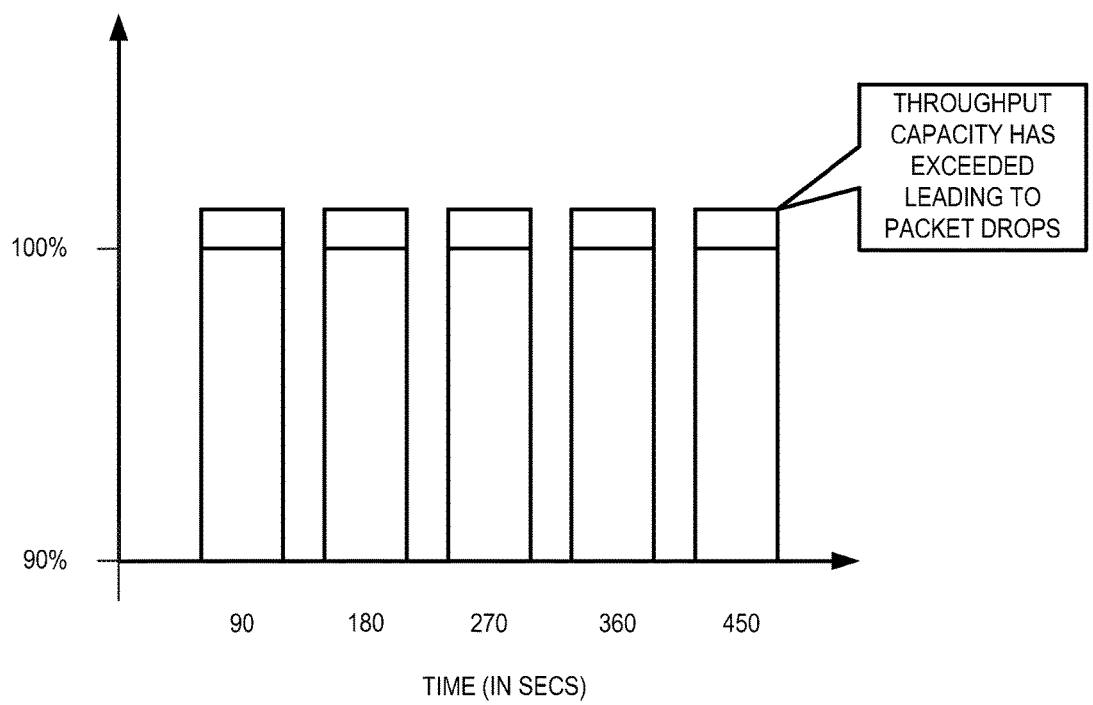
FIG. 11 is a graph of throughput capacity associated with the line cards of FIG. 10.

FIG. 11 illustrates a graph of throughput capacity of the hardware on the line cards 800A, 800B over time. Note, in the exemplary embodiment of FIG. 11, the periodic update interval between the line cards 800A, 800B for learnt MAC addresses is 90 secs. It is shown that every 90 secs, the line cards 800A, 800B can experience a spike in throughput capacity that is in excess of overall capacity leading to packet loss due to the MAC address synchronization between the line cards 800A, 800B. Also, note the line card 800A requires hardware involvement of both the NP/ASIC 816 and the Ethernet manager 812 in conventional MAC address synchronization.

Figure 12:
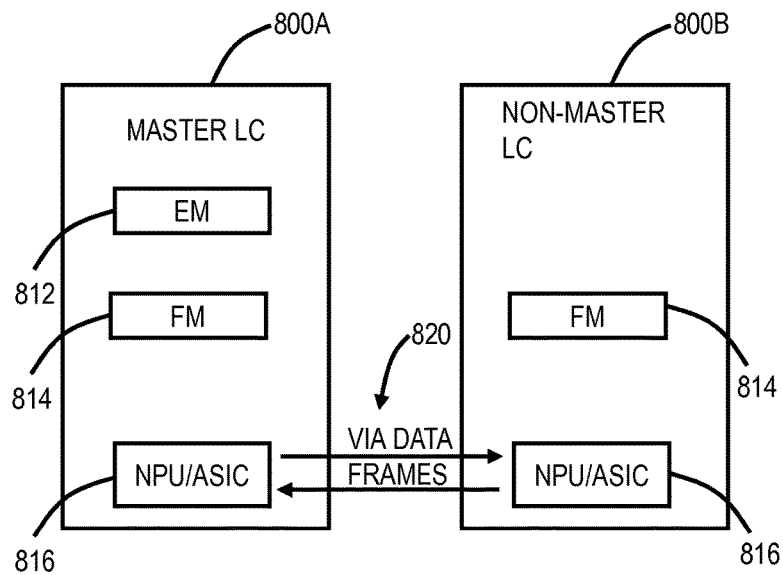
FIG. 12 is a block diagram of two line cards (LCs) performing MAC address synchronization in accordance with load balancing systems and methods described herein.
Figure 13:
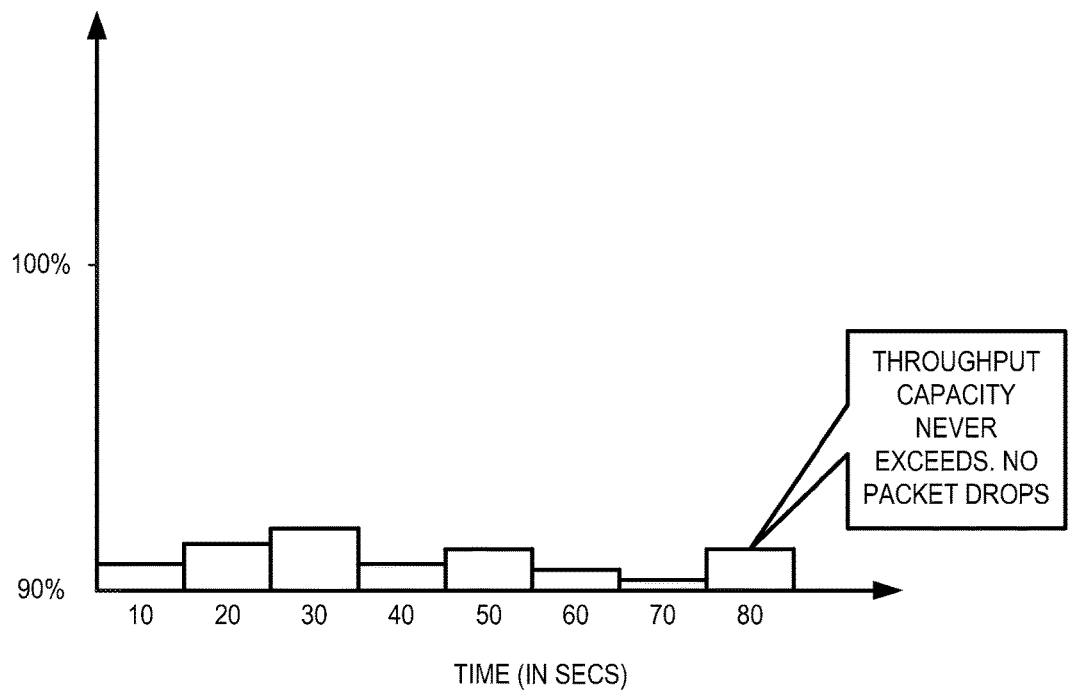
FIG. 13 is a graph of throughput capacity associated with the line cards of FIG. 12.

Referring to FIGS. 12-13, in exemplary embodiments, a block diagram (FIG. 12) illustrates line cards (LC) 800A, 800B for MAC address synchronization therebetween in accordance with the systems and methods described herein and a graph (FIG. 13) of throughput capacity of the line cards 800A, 800B. The load balancing systems and methods described herein propose elimination of processor (i.e. the Ethernet manager 812) involvement in the learning of dynamic MAC entries. Instead, the NP/ASICs 816 are configured to communicate therebetween across the line cards 800A, 800B (and any additional line cards in systems with more than two line cards) for MAC address synchronization. Note, the Ethernet manager 812 is still involved in overall system operation in the line cards 800A, 800B including MAC entry user requests such as display and deletion of entries and the like. Removing the MAC address synchronization from the Ethernet manager 812 relieves the Ethernet manager 812 for other critical applications such as xSTP (i.e., various Spanning Tree Protocol algorithms), LAG (Link Aggregation Group), IGMP (Internet Group Management Protocol), etc.

The load balancing systems and methods described herein contemplate "off-the-shelf" NP/ASICs 816 as well as custom designed circuits. In particular, the load balancing systems and methods contemplate software, firmware, etc. to program the NP/ASICs 816 to perform the foregoing functions thereby relieving the Ethernet manager 812 (i.e., a CPU on the line card 800A) from MAC address synchronization and learning. The NP/ASICs 816 are configured to learn unknown unicast MAC entries in both ingress and egress direction. In the load balancing systems and methods, the NP/ASIC 816 on learning a new MAC shall not interrupt the Ethernet manager 812, so that Ethernet manager 812 is not involved in learning of the MAC. All the MAC learning that needs to be done shall only have the involvement of the NP/ASIC 816 only. On the egress side, the NP/ASIC 816 has an additionally responsible of learning the new MAC when flooding/forwarding data frames.

Also, with the network processor-based learning, the NP/ASIC 816 will additionally be involved in MAC learning from the fabric side (in addition to the port side). Also, the ingress NP/ASIC 816 is responsible for extracting/transmitting the extra fields required by an egress NP/ASIC 816 to learn the MAC address. It is expected that the forwarding module 814 for the associated NP/ASIC 816 can still use an interrupt based messaging approach to retrieve newly learned MAC addresses on the same line card 800A, 800B. However, the forwarding module 814 does not send the MAC addresses to the Ethernet manager 812 thus reducing messaging between the forwarding module 814 and the Ethernet manager 812.

It is to be noted that with network processor-based learning there can be situation where Link Aggregation Group (LAG) member ports are spread across the line cards 800A, 800B (and other line cards). One of the line cards 800A, 800B performs the learning on LAG logical port (lport)/Stacked LAG lport and it will not be propagated to the other line cards 800A, 800B as the flow of traffic did not required to do so. With network processor-based learning, this can be issue which can be solved via in-band messaging between the NP/ASICs 816 to keep them updated with the MAC entries learnt on LAG interfaces. In order to optimize this approach, this in-band messaging is only enabled on a particular Virtual Local Area Network (VLAN) when some LAG based lport is included as a member therein.

The forwarding module 814 can be responsible for setting a LAG present bit in a VLAN table (VLAN_STR_NUM) in the NP/ASIC 816. The LAG present bit is set for any VLAN that has at least one LAG interface having LAG members spread across the line cards 800A, 800B. When the LAG present bit is set, the NP/ASIC 816 uses the LAG in-band messaging for synchronizing the MAC learnt for the VLAN. Also, the forwarding module 814 is configured to coordinate with the NP/ASIC 816 for forwarding/flooding of traffic to the egress side.

In conventional operation, the NP/ASIC 816 performs MAC learning at the ingress side only (i.e., packets received from front ports and Optical Transport Network (OTN) ports are inspected for new MAC addresses). When a new packet is received by the NP/ASIC 816, processing is performed based on the direction it came from. The NP/ASIC 816 can include circuitry and logic to send the packet to the appropriate place (ingress port, or fabric side). On the ingress side, the NP/ASIC 816 reads any VLAN tag value, the source and destination MAC addresses and forms a lookup key which is passed to functions in the NP/ASIC 816 for lookup and classification of the packet and for forwarding and Quality of Service decisions. The NP/ASIC 816 performs the MAC addresses lookup and passes the result to the logic for forwarding and Quality of Service decisions. Again in the logic for forwarding and Quality of Service decisions, the ingress path logic inspects the lookup results and the message it has received. A learning operation is performed if the source MAC address is unknown. In the network processor-based learning described herein, the NP/ASIC 816 is further configured to mimic the conventional operation on the ingress path in the "from fabric" path. That is, in order to achieve egress learning, some of the operations described earlier for the ingress path are ported/implemented for the "from fabric path".

In addition to having the NP/ASIC 816 responsible for learning MAC addresses (without involvement of a processor such as the Ethernet manager 812), the load balancing systems and methods include a synchronization strategy between different line cards 800A, 800B reducing overall throughput. First, the NP/ASICs 816 are configured to synchronize their MAC addresses via communication over data frames 820 therebetween. That is, the NP/ASICs 816 are configured to communicate newly learned MAC addresses to other NP/ASICs 816 via data frames 820 addressed thereto. The data frames 820 are also sent according to a hash-based time slot strategy where each flow on creation is assigned a time slot at which its entry will be updated on all the line cards 800A, 800B to effectively distribute the updating of MAC addresses over a period of time instead of confining it as a single one time event. FIG. 13, for example, illustrates a graph of throughput capacity showing the load balancing systems and methods. As noted by comparing FIG. 13 to FIG. 11 (i.e., conventional approaches), the load balancing systems and methods assure throughput capacity is not exceeding on the line cards 800A, 800B thereby preventing packet drops.

The hash-based time slot strategy is a constraint upon the NP/ASICs 816 determining when and what MAC addresses are synchronized. The objective of the hash-based time slot strategy is to distribute MAC address synchronization to avoid packet drops based thereon. In the hash-based time slot strategy, Ethernet flows are classified on the basis of a hash algorithm which computes a hash value on the basis of a tuple. The tuple includes MAC Source/Destination address, Internet Protocol (IP) Source/Destination address, protocol type, and Transmission Control Protocol (TCP) source port. On the basis of the hash value, learnt MAC addresses on one NP/ASIC 816 (e.g., the NP/ASIC 816 on the line card 800A) are synchronized other NP/ASICs 816 (e.g., the NP/ASIC 816 on the line card 800B). The following table gives an example of how various flows are assigned to different offsets of time depending upon the above mentioned parameters.

| FlowId | Arrival Time | Time Slot offset (in secs) |
| --- | --- | --- |
| Flow A | X | 0 |
| Flow B | X | +1 |
| Flow C | X | +5 |
| Flow D | X | +7 |

The hash-based time slot strategy of the load balancing systems and methods decreases the throughout load by distributing it over a period of time. As illustrated in FIG. 13, throughput load is now not a constant high but the time slot strategy has now distributed the load over a period of time.

The objective of the hash-based time slot strategy is to distribute MAC address synchronization over time as opposed to a single event every X secs. For example, assume each of the line cards 800A, 800B supports 128 k MAC addresses. In the conventional embodiments of FIGS. 10-11, the line cards 800A, 800B synchronizing 128 k MAC addresses approximately every 90 secs. In the hash-based time slot strategy, the objective is to break down the synchronization of the 128 k MAC addresses such as 2 k MAC addresses being synchronized every sec. The hash-based time slot strategy can include various hashing algorithms each of which is configured to slot newly learned MAC addresses into time slots for MAC address synchronization in a distributed manner. The foregoing descriptions include exemplary hashing algorithms.

In an exemplary embodiment, in the case of layer 2 packets, the parameters affecting the hashing algorithm for packets with newly learned MAC addresses include hardware logical port identification (HW_LportID), a first VLAN ID (if present), a second VLAN ID (if present), destination MAC address, and source MAC address. For the source and destination MAC addresses, these are 96 bits (i.e., 48 bits each for the source and destination MAC addresses) stored as three 32 bit variables, mac_addr1, mac_addr2, mac_addr3. The objective from the aforementioned parameters is to reduce these parameters to a smaller value (e.g., a 4 bit number) that can be used to slot the packets in a time slot for MAC address synchronization. This smaller value can be denoted as hash_result which is initially set to zero.

If a newly learned MAC address packet has two VLANs present, the hashing algorithm for finding the time slot for synchronization can include the following operations in order:

hash_result=XOR(vlan1, vlan2)//16 bit operation
hash_result=XOR(hash_result, HW_LportID)//16 bit operation
temp_variable=XOR(hash_result, mac_addr1)//32 bit xoring
temp_variable=XOR(hash_result, mac_addr2)//32 bit xoring hash_result=XOR (temp_variable, mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower_8 bits of hash_result)//4 bit result The hash_result is passed on to circuitry and logic in the NP/ASIC 816 and used to determine when this newly learned MAC address is synchronized with other NP/ASICs 816. Also, these operations can be performed in the NP/ASIC 816 or in other circuitry and logic.

If a newly learned MAC address packet has one VLAN present, the hashing algorithm for finding the time slot for synchronization can include the following operations in order:

hash_result=XOR(vlan_id1, HW_LportID)//16 bit operation
temp$_{13}$ variable=XOR(hash_result, mac_addr1)//32 bit xoring
temp_variable=XOR(hash_result, mac_addr2)//32 bit xoring
hash_result=XOR(temp_variable, mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower_8 bits of hash_result)//4 bit result The hash_result is passed on to circuitry and logic in the NP/ASIC 816 and used to determine when this newly learned MAC address is synchronized with other NP/ASICs 816. Also, these operations can be performed in the NP/ASIC 816 or in other circuitry and logic.

If a newly learned MAC address packet has no VLANs present, the hashing algorithm for finding the time slot for synchronization can include the following operations in order:

hash_result=XOR(hash_result, HW_LportID)//16 bit operation
temp_variable=XOR(hash_result, mac_addr1)//32 bit xoring
temp_variable=XOR(hash_result, mac_addr2)//32 bit xoring
hash_result=XOR (temp_variable, mac_addr3)//32 bit xoring
hash_result=XOR(upper_16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower_8 bits of hash_result)//4 bit result The hash_result is passed on to circuitry and logic in the NP/ASIC 816 and used to determine when this newly learned MAC address is synchronized with other NP/ASICs 816. Also, these operations can be performed in the NP/ASIC 816 or in other circuitry and logic. Thus, in the case of no VLANs, the hashing algorithm is based on the source and destination MAC addresses and the hardware logical port IDs. This hashing algorithm takes two 48 bit numbers, the source and destination MAC addresses, and one 16 bit number, the hardware logical port ID, and coverts it into a single 4 bit number used to slot the MAC address synchronization time slot.

In an exemplary operation, assume a new source MAC address of 00:10:94:00:00:02 is learned with a corresponding destination MAC address of 00:00:01:00:00:01. Further, assume no VLAN is present and the HW_LportID is 2104 (port 9)=0x838. The following illustrates an exemplary operation of the aforementioned exemplary hashing algorithm.

hash_result = $XOR$(0, 0x0838)//16 bit operation; note hash_result initially= 0
= 0x0838 temp_variable = $XOR$(0x0838, 0x00000100)//32 bit xoring
= 0x938 temp_variable = $XOR$(0x938, 0x00010010)//32 bit xoring
= 0x10928 hash_result = $XOR$(0x10928, 0x94000002)//32 bit xoring
= 0x9401092A hash_result = $XOR$(0x9401, 0x092A)//16 bit
= 0x9D2B hash_result = $XOR$(0x9D, 0x2B)//8 bit
= B6 hash_result = $XOR$(0XB, 0x6)//4 bit result
= D//passed on to circuitry and logic XOR is an exclusive OR logical operation which can be implemented in the NP/ASIC 816, in circuitry and logic, in software, or in a combination thereof In an exemplary embodiment, in the case of bridging, the parameters affecting the hashing algorithm for packets with newly learned MAC addresses include a first VLAN ID (if present), a second VLAN ID (if present), a destination MAC address, a source MAC address, a destination Internet Protocol (IP) (DIP) address, a source IP (SIP) address, and whether or not the IP protocol is being used. For the source and destination MAC addresses, these are 96 bits (i.e., 48 bits each for the source and destination MAC addresses) stored as three 32 bit variables, mac_addr1, mac_addr2, mac_addr3. The objective from the aforementioned parameters is to reduce these parameters to a smaller value (e.g., a 4 bit number) that can be used to slot the packets in a time slot for MAC address synchronization. This smaller value can be denoted as hash_result which is initially set to zero.

The hashing algorithm, in the case of bridging, the hashing algorithm for finding the time slot for synchronization can include the following operations in order:
hash_result=XOR(vlan1, vlan2)//if VLANs are present
hash_result=XOR(hash_result, IPprotocol)//8 bit operation if IP packet present
temp=XOR(hash_result, DIP)//32 bit operation if IP packet present
hash_result=XOR(hash_result, SIP)//32 bit operation if IP packet present
temp_variable=XOR(hash_result,mac_addr1)//32 bit xoring
temp_variable=XOR(hash_result,mac_addr2)//32 bit xoring
hash_result=XOR (temp_variable,mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit hash_result=XOR(upper_4 bit of hash_result,lower_8 bits of hash_result)//4 bit result The hash_result is passed on to circuitry and logic in the NP/ASIC 816 and used to determine when this newly learned MAC address is synchronized with other NP/ASICs 816. Also, these operations can be performed in the NP/ASIC 816 or in other circuitry and logic.

With the load balancing systems and methods, the Ethernet manager 812 and the associated CPU as well as the forwarding module 814 are freed from the distribution of MAC entries across line cards 800A, 800B. However, the Ethernet manager 812 still needs to keep track of MAC entries to handle the User Interface requests. The Ethernet manager 812 and the associated CPU need to handle a MAC fetch from the NP/ASIC 816. Two exemplary approaches include a user triggered approach and an asynchronous read approach. In the asynchronous read approach, asynchronous reads of MAC addresses are performed from the NP/ASIC 816. Here, the forwarding module 814 keeps its local database updated all of the time. This approach requires ongoing operations to continually synchronize the MAC addresses from the NP/ASIC 816 to the forwarding module 814.

In the user triggered approach, there is no collection of MAC addresses that are done in the normal course of operation of the Ethernet manager 812. Only when a user wants the information of MAC addresses is there a fetch operation from the NP/ASIC 816. Parameters are received by the user (e.g., either via Command Line Interface (CLI), Hypertext Transfer Protocol (HTTP) or Simple Network Management Protocol (SNMP)). The forwarding module 814 is configured to receive this request for a current snapshot of the MAC address table in the NP/ASIC 816. Once the forwarding module 814 obtains the current snapshot, it is provided to the Ethernet manager 812 as well as stored in a local database of the forwarding module 814 (i.e., replacing any previous snapshots). This local database of the forwarding module 814 can be solely used for providing MAC addresses to users, and not for forwarding decisions. For example, upon detection of topology changes, the forwarding module can be only responsible for ensuring learnt MAC entries are removed from the NP/ASIC 816 and not from its own local database. This approach has the benefit in itself that it relieves the Ethernet manager 812 and the associated CPU for other important tasks. Further, this approach only requires operations when the user wants to view the current snapshot.

Figure 14:
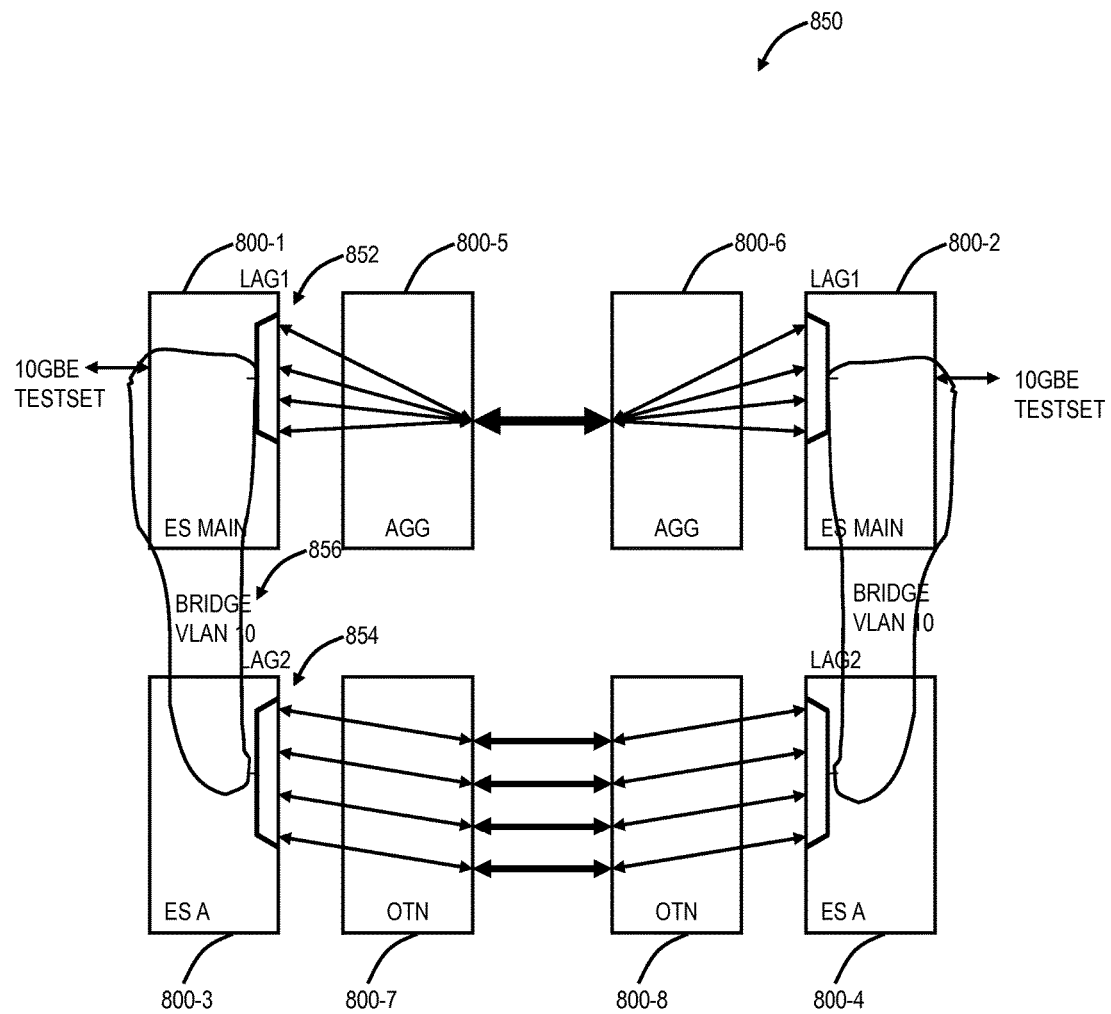
FIG. 14 is a block diagram of an exemplary operation of the load balancing systems and methods across plural line cards in an exemplary system.

Referring to FIG. 14, in an exemplary embodiment, a block diagram illustrates an exemplary operation of the load balancing systems and methods across plural line cards 800 in a system 850. The system 850 can be a node (also known as a network element) with a multi-slot architecture. In the example of FIG. 14, the system 850 includes eight line cards 810-1-810-8 for illustration purposes. The system 850 includes four Ethernet switching (ES) line cards 810-1-810-4. In this example, the line cards 810-1, 810-2 are designed as masters and the line cards 810-3, 810-4 are designated as non-masters. The system 850 further includes four transport line cards (AGG, OTN) 810-5-810-8. The transport line cards 810-5-810-8 are meant to optical connect the ES line cards 810-1-810-4 over a distance, for example. The ES line card 810-1 is connected to the ES line card 810-2 via the aggregator (AGG) line cards 810-5, 810-6. The AGG line cards 810-5, 810-6 can provide multiplexing, such as four GbE signals into a larger signal. This multiplexing can include OTN multiplexing using ODUflex connections.

The ES line cards 810-3, 810-4 are connected via OTN transponder line cards 810-7, 810-8 that can transport GbE signals, for example, over OTN connections. The load balancing systems and methods are performed between the line cards 810,1, 810-3 and between the line cards 810-2, 810-4. For example, a LAG group 852 is set up between the line cards 810-1, 810-2 and a LAG group 854 is set up between the line cards 810-3, 810-4, each of the LAG groups 852, 854 being four lines. Further, the system 850 includes a VLAN bridge 856 between the LAG groups 852, 854. In the context of the foregoing, the line cards 810-1, 810-3 and the line cards 810-2, 810-4 can coordinate with one another using the load balancing systems and methods described herein.

In an exemplary embodiment, an Ethernet system includes a first line card including at least one port receiving Ethernet data packets and a first data path device; and a second line card including at least one port receiving Ethernet data packets and a second data path device, wherein the second line card is communicatively coupled to the first line card; wherein the first data path device is configured to synchronize learned Media Access Control (MAC) addresses with the second data path device by exchanging of data packets therebetween according to a hash-based time slot approach. The first data path device can be configured to learn MAC addresses received from a port side and from a fabric side associated with the first line card. The hash-based time slot approach can be configured to distribute the data packets of learned MAC addresses over time to prevent adverse effects on packet traffic. The hash-based time slot approach can be configured to slot newly learned MAC addresses into time slots for an associated data packet to be sent to the second data path device. The hash-based time slot approach can utilize a plurality of parameters to assign a newly learned MAC address to a time slot for synchronization. The plurality of parameters can include any of hardware logical port identification, virtual local area network identification, destination MAC address, and source MAC address. The hash-based time slot can include a plurality of XOR operations on the plurality of parameters to derive a time slot. The first data path device, upon learning a new MAC address associated with a link aggregation group, can be configured to in-band message the second data path device the new MAC address. The Ethernet system can further include a first general processor on the first line card; and a second general processor on the second line card; wherein the first general processor and the second general processor do not participate in the learning MAC addresses. The first general processor can be configured to fetch MAC addresses from the first data path device responsive to a user request.

In another exemplary embodiment, a data path device includes logic circuitry configured to learn Media Access Control (MAC) addresses both from a port side and a fabric side; and logic circuitry configured to synchronize learned MAC addresses with at least one additional data path device disposed on a separate line card; wherein the synchronized learned MAC addresses are sent to the at least one additional data path device via data packets according to a hash-based time slot approach. The hash-based time slot approach can be configured to distribute the data packets of learned MAC addresses over time to prevent adverse effects on packet traffic. The hash-based time slot approach can be configured to slot newly learned MAC addresses into time slots for an associated data packet to be sent to the at least one additional data path device. The hash-based time slot approach can utilize a plurality of parameters to assign a newly learned MAC address to a time slot for synchronization. The plurality of parameters can include any of hardware logical port identification, virtual local area network identification, destination MAC address, and source MAC address. The hash-based time slot can include a plurality of XOR operations on the plurality of parameters to derive a time slot. The logic circuitry configured to synchronize learned MAC addresses, upon learning a new MAC address associated with a link aggregation group, can be configured to in-band message the at least one additional data path device the new MAC address.

In yet another exemplary embodiment, a method includes utilizing a first data path device on a first line card to learn Media Access Control (MAC) addresses; synchronizing newly learned MAC addresses with at least one additional data path device on a separate line card from the first line card, wherein the synchronizing includes exchanging a data packet according to hash-based time slot approach; and operating a generalized processor on the first line card without the generalized processor being involved in the synchronizing newly learned MAC addresses. The method can further include performing a plurality of XOR operations on a plurality of parameters associated with a packet having a newly learned MAC address to determine a time slot for the data packet. The method can further include determining a newly learned MAC address is involved in a link aggregation group (LAG) associated with the separate line card; and in-band messaging the at least one additional data path device with the newly learned MAC address.

It will be appreciated that some exemplary embodiments described herein may include one or more generic or specialized processors ("one or more processors") such as microprocessors, digital signal processors, customized processors such as NPUs, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method implemented by a plurality of interconnected switches in a multi-switch architecture, the method comprising:
    learning a media access control (MAC) address at a first switch in a multi-switch architecture;
    storing the MAC address in a forwarding database of the first switch;
    transmitting a synch data frame to one or more switches in the multi-switch architecture via inter-switch connectivity between the first switch and the one or more switches for synchronization using a distributed approach, wherein the inter-switch connectivity comprises at least two ports and queues comprising a data path queue and a separate queue between each of the plurality of interconnected switches, wherein each of the data path queue and the separate queue are configured for transmitting data frames between each of the plurality of interconnected switches, wherein the synch data frame is created to enable the one or more switches to learn the MAC address therefrom, wherein the transmitting of the sync data frame is via the separate queue that is separate from the data path queue, wherein the separate queue is constrained to only provide synch data frames between the plurality of interconnected switches, and wherein the distributed approach assigns slots to transmit learned MAC addresses over time based on a time offset determined based on the learned MAC address for the transmitting;
    learning the MAC address from the data frame at the one or more switches; and
    storing the MAC address in a forwarding database for each of the one or more switches.

2. The method of claim 1, further comprising:
    transmitting the data frame with a source address comprising the MAC address and a switch destination set such that all switches in the multi-switch architecture receive the data frame.

3. The method of claim 1, wherein the data frame comprises a first data frame, and further comprising:
    transmitting the first data frame to the one or more switches in one direction; and
    transmitting a second data frame in another direction on the inter-switch connectivity to another switch in the multi-switch architecture, wherein the second data frame is created to enable the another switch to learn the MAC address therefrom.

4. The method of claim 1, further comprising:
    transmitting the data frame with a source address comprising the MAC address, a switch destination set such that all switches in the multi-switch architecture receive the data frame, and an invalid destination port so the data frame is dropped at the switch destination.

5. The method of claim 1, further comprising:
    transmitting the data frame as a sync unicast packet comprising an inter-switch header and a Layer-2 header.

6. The method of claim 5, wherein the inter-switch header comprises a source switch indicator identifying the first switch, a source port identifier identifying a port on the first switch which learned the MAC address, a destination switch comprising a last switch of the one or more switches, and a destination port set to an invalid port on the last switch; and wherein the Layer-2 header comprises any value for a destination address, a source address set to the MAC address, and empty data.

7. The method of claim 1, wherein the first switch and the one or more switches are configured in a link aggregation group.

8. The method of claim 1, wherein the inter-switch connectivity operates on a backplane of a chassis.

9. The method of claim 1, further comprising:
upon learning the MAC address at the first switch and transmitting the data frame, establishing a synchronization refresh timer less than an aging time for the MAC address; and
resending the data frame at an expiration of the synchronization refresh timer.

10. The method of claim 1, wherein the first switch and the one or more switches are managed as a single switch from a network element perspective and a network management perspective.

11. A multi-switch architecture, comprising:
a plurality of interconnected switches each comprising one or more ports thereon and a forwarding database;
inter-switch connectivity connecting the plurality of interconnected switches, wherein the inter-switch connectivity comprises at least two ports and queues between each of the plurality of interconnected switches;
data path queues associated with the inter-switch connectivity; and
a dedicated queue associated with the inter-switch connectivity and separate from the data path queues, wherein both the data path queues and the dedicated queue are each configured for transmission of data frames between each of the plurality of interconnected switches, wherein the dedicated queue is only configured for the exchange of synch data frames between the plurality of interconnected switches for synchronization of the forwarding database of each of the plurality of interconnect switches using a distributed approach;
wherein, upon learning a new media access control (MAC) address on a port of the one or more ports of a switch of the plurality of interconnected switches, the switch transmits a sync data frame on through the dedicated queue for the remaining interconnected switches to learn the new MAC address, and wherein the distributed approach assigns slots to transmit learned new MAC addresses over time based on a time offset determined based on the learned new MAC address.

12. The multi-switch architecture of claim 11, wherein the data frame comprises a source address comprising the new MAC address and a switch destination set such that all switches in the multi-switch architecture receive the data frame.

13. The multi-switch architecture of claim 11, wherein the data frame comprises a source address comprising the new MAC address, a switch destination set such that all switches in the multi-switch architecture receive the data frame, and an invalid destination port so the data frame is dropped at the switch destination.

14. The multi-switch architecture of claim 11, wherein the data frame comprises a sync unicast packet comprising an inter-switch header and a Layer-2 header.

15. The multi-switch architecture of claim 14, wherein the inter-switch header comprises a source switch indicator identifying the switch, a source port identifier identifying a port on the switch which learned the MAC address, a destination switch comprising a last switch of the plurality of interconnected switches, and a destination port set to an invalid port on the last switch; and
wherein the Layer-2 header comprises any value for a destination address, a source address set to the MAC address, and empty data.

16. The multi-switch architecture of claim 11, wherein the plurality of switches are configured in a link aggregation group.

17. The multi-switch architecture of claim 11, wherein the inter-switch connectivity operates on a backplane of a chassis.

18. The multi-switch architecture of claim 11, wherein the plurality of interconnected switches are managed as a single switch from a network element perspective and a network management perspective.

19. A switch, comprising:
a plurality of ports;
switching circuitry communicatively coupled to the plurality of ports;
a forwarding database communicatively coupled to the switching circuitry; and
inter-switch connectivity connecting the switch to one or more switches collectively forming a multi-switch architecture managed as a single network element, wherein the inter-switch connectivity comprises at least two ports and queues comprising a data path queue and a separate queue between each of the plurality of interconnected switches between the switch and the one or more switches, and wherein each of the data path queue and the separate queue is configured for transmission of data frames between each of the plurality of interconnected switches;
wherein the switch is configured to:
learn new media access control (MAC) addresses received on data ports and ports dedicated to receiving sync packets on the inter-switch connectivity; and
transmit a sync packet on ports dedicated to only transmitting sync packets on the inter-switch connectivity using a distributed approach, wherein the sync packets comprise a source address set to a MAC address to be learned, a destination switch set to a last switch in the one or more switches, and a destination port set to invalid, wherein the sync packet is transmitted through only the separate queue, and wherein the distributed approach assigns slots to transmit learned MAC addresses over time based on a time offset determined based on the learned MAC address for transmission of the sync packet.

* * * * *